Figure 1:
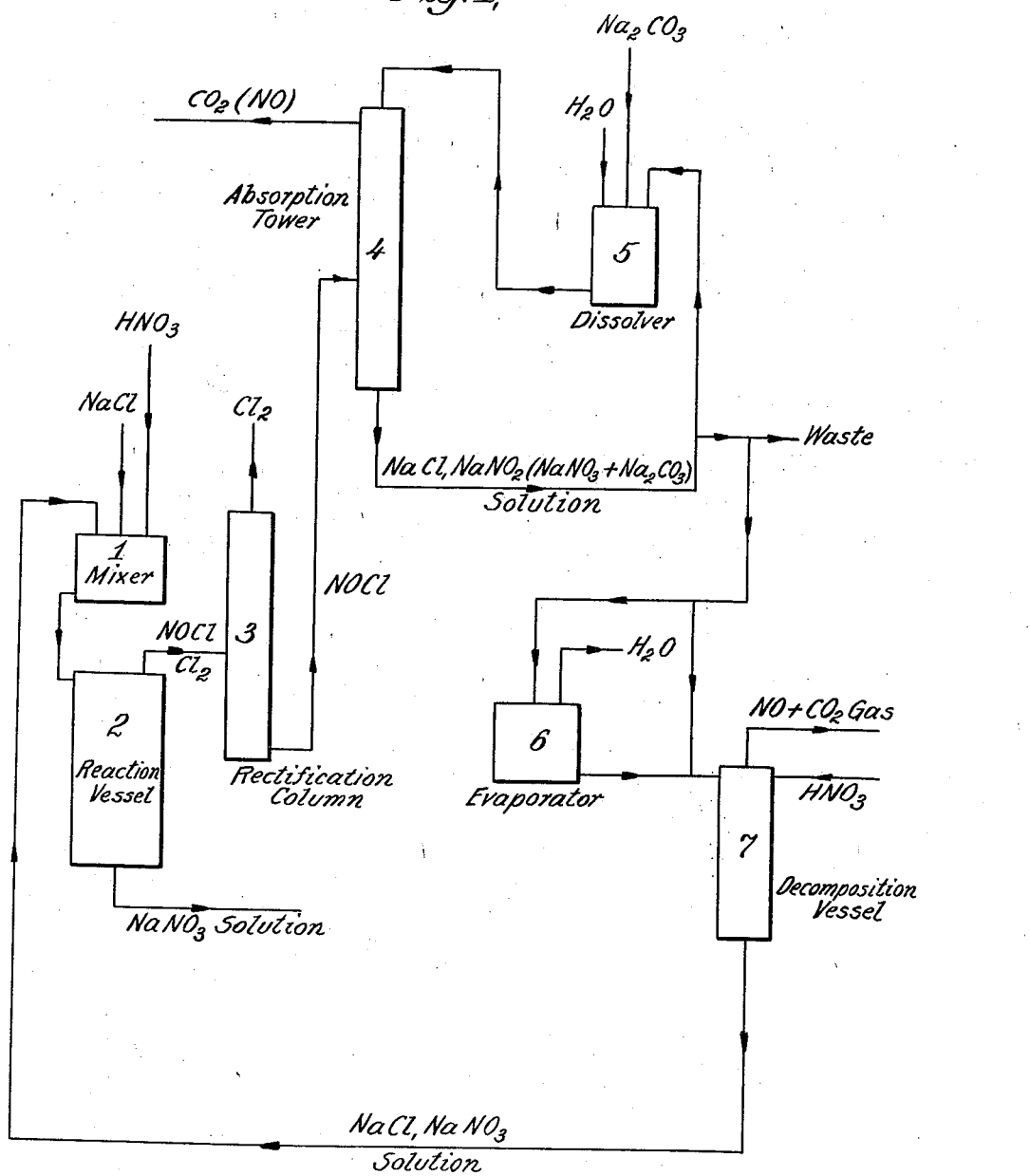

Aug. 13, 1940.　　H. A. BEEKHUIS, JR　　2,211,531

DECOMPOSITION OF NITROSYL CHLORIDE

Filed Nov. 4, 1938　　2 Sheets-Sheet 1

INVENTOR
Herman A. Beekhuis, Jr.
BY
ATTORNEY

Patented Aug. 13, 1940

2,211,531

UNITED STATES PATENT OFFICE 2,211,531

DECOMPOSITION OF NITROSYL CHLORIDE

Herman A. Beekhuis, Jr., Petersburg, Va., assignor to The Solvay Process Company, New York, N. Y., a corporation of New York Application November 4, 1938, Serial No. 238,786

8 Claims. (Cl. 23—102)

This invention relates to a process for the treatment of the gaseous mixture of chlorine and nitrosyl chloride evolved by reaction of nitric acid and a metal chloride, to decompose the nitrosyl chloride with the formation of a nitrite and a chloride. The invention more particularly relates to the treatment of the mixture of chlorine and nitrosyl chloride to recover the free chlorine and to convert at least a part of the chlorine and nitrogen combined as nitrosyl chloride into a chloride and eventually into free chlorine and into a nitrite or nitrate.

It is known that nitric acid and a metal chloride, for example an alkali metal chloride such as sodium or potassium chloride, or an alkaline earth metal chloride such as calcium chloride, may be reacted with nitric acid to form the corresponding nitrate and to evolve a gas mixture containing nitrosyl chloride and chlorine. Numerous processes have heretofore been proposed for treating this gas mixture to separately recover the chlorine and fixed nitrogen contained therein.

It is an object of this invention to provide a process whereby a metal chloride may be reacted with nitric acid and the resulting mixture of chlorine and nitrosyl chloride may be treated to recover the chlorine and to dispose of the nitrosyl chloride, and preferably to recover as free chlorine and to convert into nitrite at least a part of the chlorine and nitrogen combined in the nitrosyl chloride. Other objects of the invention will appear hereinafter.

In treating the mixture of chlorine and nitrosyl chloride formed by reaction of a metal chloride and nitric acid in accordance with this invention, the mixture is first treated to separate the chlorine from the nitrosyl chloride. This separation may be accomplished, for example, by condensation of the nitrosyl chloride and chlorine and fractional distillation of the liquid mixture to vaporize the chlorine and separate it from liquid nitrosyl chloride. Or the nitrosyl chloride may be absorbed in cold concentrated nitric acid, the chlorine gas escaping unabsorbed. By heating the resulting acid solution, the nitrosyl chloride is evolved.

I have discovered that after separation from the chlorine the nitrosyl chloride may be reacted with an alkaline liquor to form a solution of a nitrite and chloride. Nitrate may also be formed from the nitrosyl chloride, the proportion of nitrate to nitrite depending upon the alkalinity of the solution used for absorbing the nitrosyl chloride. The stronger the alkalinity of the solution throughout its contact with the nitrosyl chloride, the lower will be the ratio of nitrate to nitrite in the resulting solution. The solution is preferably maintained strongly alkaline throughout its contact with the nitrosyl chloride in order not only to repress the formation of nitrate but also to insure substantially complete absorption and reaction of the nitrosyl chloride. I have found, however, that by absorbing nitrosyl chloride in an alkaline solution under conditions such that the final solution obtained has a pH of 7 or higher, nitrite is a major product of the reaction. When, therefore, the process is to be used primarily as a means for recovering the nitrogen and chlorine content of the nitrosyl chloride without regard to the amount of nitrate which may be formed, the process may be operated with the liquor and gas contacted in proportions such that the resulting solution is substantially neutral. Under these conditions substantial quantities of nitrate are formed and there may be some nitrogen oxides evolved and escape from contact with the liquor. Nevertheless, so long as the alkaline liquor is supplied in amount sufficient to maintain the liquor non-acidic throughout its contact with the nitrosyl chloride, the most of the nitrogen and chlorine content of the nitrosyl chloride is recovered in the exit liquor as chloride and nitrite with some nitrate and the amount of nitrogen escaping contact with the liquor as nitrogen oxides is not large.

The aqueous liquor contacted with the nitrosyl chloride gas may be a solution or slurry of any soluble inorganic alkaline material. For example, the nitrosyl chloride may be treated with a solution or slurry of sodium, potassium or calcium hydroxide or sodium or potassium carbonate or with a solution of ammonium hydroxide or solution or slurry of ammonium carbonate. The nitrosyl chloride may be contacted with the alkaline liquor at temperatures ranging from the freezing point to the boiling point of the liquor, although it is preferred to operate at temperatures between about 30° C. to 80° C.

In carrying out this step of the process of this invention, an alkaline aqueous liquor is preferably repeatedly circulated in a cyclic system wherein the liquor is intimately contacted with the nitrosyl chloride to decompose it with the production of a chloride and a nitrite. As alkaline material in the solution is used up by reaction with nitrosyl chloride, additional alkaline material is added to maintain the alkalinity of the solution. Solution or slurry containing nitrite and chloride is withdrawn from this cyclic system and may be treated in any of the manners hereinafter described.

The mixture of nitrosyl chloride and chlorine evolved in reacting concentrated nitric acid with a metal chloride contains about equal proportions of the two gases and the free chlorine constitutes about two-thirds of the total chlorine evolved by the reaction of the metal chloride. The nitrogen content of the nitrosyl chloride constitutes about one-quarter of that reacted with the metal chloride to form metal nitrate. Under some conditions of operation of this process for making nitrates from chlorides, it is not necessary to recover for utilization the nitrogen and chloride combined in the nitrosyl chloride. But even under these circumstances it is not feasible to vent the nitrosyl chloride to the atmosphere, since it is a highly corrosive, obnoxious gas. It is, therefore, within the purview of the present invention to provide a process for treating the mixture of nitrosyl chloride and chlorine evolved in reacting a metal chloride and nitric acid to recover the free chlorine and to dispose of part or all of the nitrosyl chloride as an innocuous solution of salts which may be run into a sewer or disposed of in other ways.

In operating in accordance with this aspect of the invention, the mixture of nitrosyl chloride and chlorine evolved in reacting nitric acid and a metal chloride is first treated to separate the free chlorine from the nitrosyl chloride. The nitrosyl chloride is then passed into contact with an alkaline solution to absorb it and form a solution of the metal chloride and metal nitrite containing more or less of the metal nitrate. The resulting salt solution may then be discharged to a sewer or disposed of in any other way. It is preferred, however, to utilize at least a portion of this solution by introducing it into a reaction mixture of nitric acid and chloride. One may thus readily convert the chloride and nitrite in this portion of the solution into additional nitrate and chlorine and recover the nitrate formed in absorbing the nitrosyl chloride.

Under other conditions, however, it is preferred to recover the chloride, nitrite and nitrate for utilization of these products of the absorption step. To do this the solution or slurry of chloride and nitrite, containing more or less nitrate, drawn from the nitrosyl chloride decomposition stage, may be treated in a number of manners for the recovery of solid chloride, nitrite and nitrate from the liquor. The chloride alone or accompanied by nitrite and/or nitrate may be in whole or in part introduced into the reaction mixture of chloride and nitric acid which is then heated to form nitrate and a mixture of nitrosyl chloride and chlorine treated in accordance with the process of this invention to recover the chlorine and then react the nitrosyl chloride with an alkaline solution.

The alkaline solution introduced into contact with the nitrosyl chloride may be substantially saturated with chloride, nitrite and nitrate and may carry these salts as solids suspended in the saturated solution. In either case, additional salts formed by reaction of the nitrosyl chloride with the alkaline material crystallize from solution as solids and may be separated from the solution on a filter without necessitating an evaporation of the solution. The mixture of salts separated from the mother liquor may be treated with nitric acid to convert the nitrite into nitrate with the evolution of nitric oxide. The resulting mixture of chloride and nitrate may then be reacted with additional chloride and nitric acid to form nitrate and the mixture of nitrosyl chloride and chlorine treated by the process of this invention.

The recovery of the salts from solution may be accomplished by evaporating the solution or by cooling it, or by evaporative cooling by subjecting the solution while at an elevated temperature to a reduced pressure, thereby evaporating water from the solution and cooling it. The mixture of crystallized solid and mother liquor obtained in any of these manners is treated to separate the solid from the mother liquor, for example, on a filter.

A solution of the chloride and nitrite formed by reaction of the nitrosyl chloride may be treated to recover the salts from solution by a fractional crystallization. For example, when the solution contacted with the nitrosyl chloride is maintained alkaline with an alkaline sodium compound such as sodium hydroxide or carbonate, the solution of sodium chloride and nitrite, which may also contain some sodium nitrate, withdrawn from contact with the nitrosyl chloride may first be evaporated to crystallize sodium chloride, which is filtered off from the solution, and the mother liquor then cooled to crystallize sodium nitrite, with or without sodium nitrate. The mother liquor from which nitrite is crystallized may again be evaporated, preferably with added fresh solution from the nitrosyl chloride decomposition step, to crystallize sodium chloride and cooled to crystallize sodium nitrite. By maintaining the solution contacted with the nitrosyl chloride strongly alkaline, thereby minimizing the amount of sodium nitrate formed, and by withdrawing a part of the mother liquor from which sodium nitrite has been recovered without returning it to the evaporation step, an excessive accumulation of sodium nitrate in the solution from which the chloride and nitrite are repeatedly crystallized may be prevented and relatively pure sodium nitrite obtained.

Figure 2:
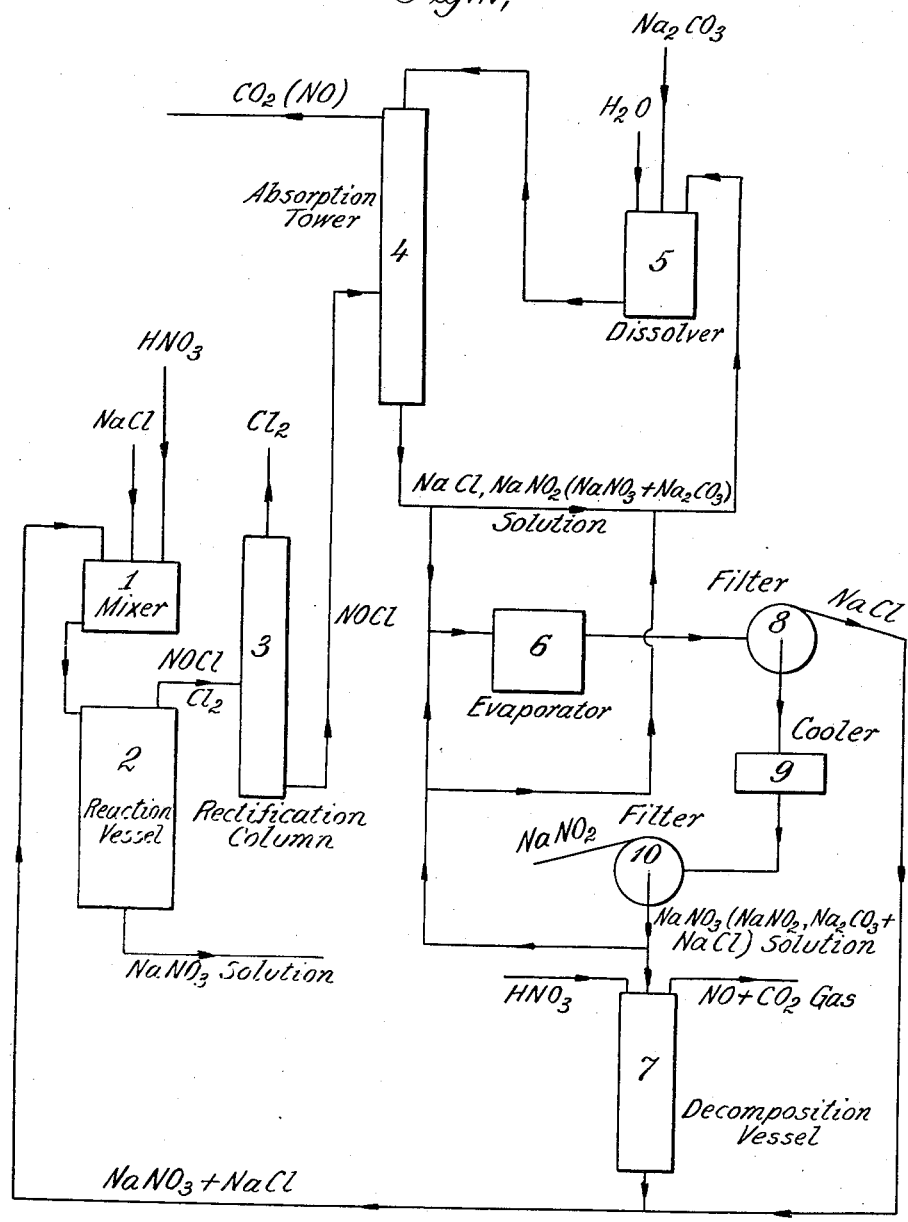

The invention will be more particularly described in conjunction with the processes for the production of sodium nitrate which are illustrated in the accompanying drawings, although the invention is not limited to these particular processes. In the drawings, Fig. 1 illustrates a process for reacting sodium chloride and nitric acid to form sodium nitrate and a mixture of nitrosyl chloride and chlorine, for recovering the chlorine separate from the nitrosyl chloride, for absorbing the nitrosyl chloride to form a solution of sodium chloride, sodium nitrite and sodium nitrate and for returning these salts for reaction of the sodium chloride with nitric acid after decomposition of the nitrite by means of nitric acid to convert it into nitrate. Fig. 2 illustrates a modification of the process of Fig. 1, in which the solution of sodium chloride, sodium nitrite and sodium nitrate is treated to recover sodium nitrite as a product and to return sodium chloride and nitrate for reaction of the chloride with nitric acid.

With reference to Fig. 1 of the darwings, the numeral 1 designates a mixer in which nitric acid and sodium chloride are mixed to produce a reaction mixture suitable for treatment to form sodium nitrate and a gaseous mixture of nitrosyl chloride and chlorine. This reaction mixture is passed into a reaction vessel 2 in which it is heated. A solution of sodium nitrate is withdrawn from the bottom of vessel 2. The nitrosyl chloride-chlorine gas evolved by the reaction in vessel 2 is passed to a rectification column 3 in which the nitrosyl chloride is liquefied and is separated from the chlorine gas. The chlorine gas escaping from the top of column 3 may be subjected to further purification treatment, if desired, and may then be liquefied.

Liquid nitrosyl chloride, or gaseous nitrosyl chloride vaporized in the bottom of column 3, is withdrawn from the bottom of this column and is passed into the mid-portion of an absorption tower 4. In tower 4 the liquid or gaseous nitrosyl chloride is treated with an aqueous solution of sodium chloride, sodium nitrite, sodium nitrate and sodium carbonate at a temperature of about 30° to 80° C. This solution is supplied to the top of tower 4 as a strongly alkaline liquor at such a rate that the solution leaving the bottom of the tower contains 5 to 50 grams sodium carbonate (calculated as $Na_2CO_3$) per liter. Gaseous nitrosyl chloride (either that introduced as a gas into the tower or that vaporized from liquid nitrosyl chloride in the tower) flows upwardly in tower 4 and is scrubbed by the downwardly flowing aqueous solution. The carbon dioxide evolved by reaction of the nitrosyl chloride and sodium carbonate escapes from the top of tower 4 and may contain some small amount of NO.

Solution of sodium chloride, sodium nitrite and sodium nitrate withdrawn from the bottom of absorption tower 4 is circulated to a dissolver 5 where water and sodium carbonate are added to the solution. From the dissolver the solution, now strongly alkaline with sodium carbonate, is circulated to the top of absorption tower 4. The water is preferably added to the circulating solution in amount at least sufficient to dissolve the sodium chloride, nitrite and nitrate formed by reaction of the sodium carbonate and nitrosyl chloride.

Solution of sodium chloride, sodium nitrite and sodium nitrate is continuously withdrawn from the cyclic nitrosyl chloride absorption system comprising absorption tower 4 and dissolver 5. The withdrawn solution is in part discharged to waste and another part is treated in a decomposition vessel 7 with sufficient nitric acid to decompose the nitrite in the solution, forming nitrate and evolving NO gas. The resulting solution is passed to mixer 1 where, together with additional sodium chloride and nitric acid, it is used for preparing reaction mixture to be treated in reaction vessel 2. In thus operating about 25% of the solution withdrawn from the nitrosyl chloride absorption system may be returned to mixer 1 and the remaining 75% discharged as waste. By using about 60% to 65% nitric acid for making up the reaction mixture in mixer 1 and introducing into dissolver 5 an amount of water which will result in the formation of a solution containing less than 100 parts of water for every 10 to 30 parts of total sodium chloride, nitrite and nitrate, the introduction of a part of the solution from the nitrosyl chloride absorption system does not unduly dilute the reaction mixture.

Instead of returning solution from the nitrosyl chloride absorption step to mixer 1 after treatment with nitric acid, this solution may be concentrated in an evaporator 6 and then treated with nitric acid in decomposition vessel 7. The resulting solution or slurry of sodium chloride and sodium nitrate is returned from vessel 7 to mixer 1. By evaporating water from the solution in evaporator 6, the amount of solution returned from the nitrosyl chloride absorption system to mixer 1 may be increased to any desired extent without unduly diluting with water the reaction mixture heated in vessel 2. Thus, if desired, all of the solution containing sodium chloride, sodium nitrite and sodium nitrate formed in absorbing the nitrosyl chloride may be evaporated, treated with nitric acid and returned for use in making up reaction mixture containing additional sodium chloride and nitric acid which is treated in reaction vessel 2. However, sufficient water should be evaporated from the solution in evaporator 6 so that the reaction mixture prepared in mixer 1 contains at least 40 parts of $HNO_3$ for every 60 parts of $H_2O$ and preferably at least 55 parts of $HNO_3$ for every 45 parts of water. The nitric oxide gas leaving decomposition vessel 7 may be reacted with oxygen and water to form nitric acid for use in treating the solution in vessel 7 or in making up reaction mixture in mixer 1.

Numerous changes and modifications may be made in the above procedure illustrated in Fig. 1. For example, a substantially saturated solution of sodium chloride, sodium nitrite and sodium nitrate containing dissolved sodium carbonate may be introduced to the top of absorption tower 4 and used for absorbing the nitrosyl chloride. As additional chloride, nitrite and nitrate are formed in the solution a mixture of these salts crystallizes from solution and may be removed by means of a filter. The mixture of solid salts may be introduced into mixer 1 either before or after treatment with nitric acid to decompose the nitrite. The mother liquor from which the solid salts are filtered may be recirculated through dissolver 5 for addition of sodium carbonate and returned to absorption tower 4. In such a procedure the amount of water introduced into dissolver 5 may be limited to that required to make up for the water accompanying the solid salts withdrawn from the cyclic nitrosyl chloride absorption system and that accompanying the carbon dioxide gas leaving absorption tower 4. Where salts produced by reacting the nitrosyl chloride and alkaline material are returned, as in the above example, for reaction with additional nitric acid to form a nitrate, nitrosyl chloride and chlorine, it is preferred that the alkaline material used for reaction with the nitrosyl chloride shall be a basic compound of the same metal as that in the metal chloride reacted with the nitric acid in reaction vessel 1. For example, where sodium chloride is to be reacted with nitric acid to form sodium nitrate a sodium base such as sodium carbonate or sodium hydroxide is reacted with the nitrosyl chloride in absorption tower 4. If calcium chloride is to be reacted with nitric acid to form calcium nitrate in vessel 2, calcium hydroxide is employed for reaction with the nitrosyl chloride in tower 4. It is not necessary, however, to use for reaction with the nitrosyl chloride an alkaline material containing the same metal radical as that of the chloride reacted in vessel 2. For example, with sodium chloride being introduced into reaction vessel 2 a slurry of calcium hydroxide may be introduced into tower 4, in which case a mixture of sodium nitrate and calcium nitrate may be recovered from the solution leaving the bottom of vessel 2.

In case an ammoniacal liquor is reacted with the nitrosyl chloride in tower 4, there is produced a mixture of ammonium chloride, nitrite and nitrate which may be treated with nitric acid to decompose the nitrite and the resulting mixture of ammonium chloride and ammonium nitrate may be recovered and sold for use as a fertilizer.

With reference to Fig. 2, this illustrates a modification of the process of Fig. 1 whereby sodium nitrite may be produced and recovered as a separate product.

As in the process of Fig. 1, a reaction mixture containing sodium chloride and nitric acid is prepared in mixer 1 and treated in reaction vessel 2 to form a solution of sodium nitrate. The nitrosyl chloride-chlorine gas evolved by the reaction is treated in rectification column 3 to separate the nitrosyl chloride from the chlorine. In absorption tower 4 the nitrosyl chloride is reacted with a solution containing sodium carbonate to form a solution of sodium chloride and sodium nitrite containing some sodium nitrate. For example, about 1 part by weight of NOCl gas is reacted in tower 4 with about 1.5 parts of $Na_2CO_3$ dissolved in the soluton introduced to the top of the tower. The solution entering the top of the tower contains about 1 part of sodium carbonate for every 4 parts of water. The solution leaving the bottom of tower 4 may have the following composition:

|  | Parts |
| --- | --- |
| NaCl | 0.89 |
| $NaNO_2$ | 0.88 |
| $NaNO_3$ | 0.07 |
| $Na_2CO_3$ (both $Na_2CO_3$ and $NaHCO_3$ calculated as $Na_2CO_3$) | 0.02 |
| $H_2O$ | 6 |

A portion of this solution is recirculated to dissolver 5 where it is mixed with sodium carbonate and water to form the solution containing about 1 part sodium carbonate to every 4 parts of water which is introduced to the top of absorption tower 4.

Another portion of the solution leaving the bottom of tower 4 is withdrawn to evaporator 6 where, together with cut-back liquor hereinafter described, it is evaporated at about atmospheric pressure until the nitrite concentration of the liquor reaches about 150 parts per 100 parts of water. During this evaporation sodium chloride crystallizes out of the solution in the evaporator and is separated from the evaporated liquor by means of a filter 8. The mother liquor from filter 8 is cooled to about 50° C. in a cooler 9 to crystallize sodium nitrite from the solution. sodium nitrite is recovered by means of a filter 10.

The mother liquor from filter 10 is divided. About 85% of it is returned to evaporator 6 as the cut-back liquor hereinbefore mentioned. The remaining 15% is introduced into decomposition vessel 7 where it is treated with nitric acid. The solution is then passed to mixer 1 where it is added to the sodium chloride and nitric acid used in preparing the reaction mixture for treatment in reaction vessel 2. In treating the sodium chloride-sodium nitrite-sodium nitrate solution to recover therefrom sodium chloride and sodium nitrite in accordance with the process above described, the amount of sodium carbonate in the solution circulated in the system comprising evaporator 6, filter 8, cooler 9 and filter 10 will build up due to the continuous introduction of sodium carbonate in the solution drawn from the nitrosyl chloride absorption system. If desired, in order to avoid contamination with carbonate of the sodium nitrite withdrawn from filter 10, a portion of the cut-back liquor withdrawn from this filter may be mixed with the solution passing to dissolver 5 and recirculated through absorption tower 4 for reaction of its sodium carbonate content with nitrosyl chloride.

In carrying out the process of Fig. 2 to produce and recover sodium nitrite as a product, the nitrosyl chloride may be absorbed in the alkaline solution passing through tower 4 at temperatures ranging from atmospheric upwardly to about 100° C. The solution drawn from the bottom of absorption tower 4 should be non-acidic. Accordingly, it may have an alkalinity equivalent to a pH of 7 or greater.

In recovering sodium nitrite from the solution leaving tower 4, the solution is evaporated first to crystallize only sodium chloride from the solution, i. e. the evaporation is discontinued before the solution becomes saturated with sodium nitrite at the temperature at which it is being evaporated. The solution may be evaporated at temperatures below its normal boiling point by evaporating it under a vacuum. Accordingly, the temperature at which the solution is evaporated may vary over a considerable range of temperatures, but in separately recovering the sodium chloride and sodium nitrite the temperature of the solution after removal of the sodium chloride is lowered 10° C. or more, preferably at least 50° C., by means of cooler 9 to crystallize the sodium nitrite which is recovered by means of filter 10. Thus, the temperature to which the solution from filter 8 is cooled to crystallize the sodium nitrite may range from 0 to 100° C.

Numerous changes and modifications may be made in the process of Fig. 2. For example, instead of circulating the sodium carbonate solution through dissolver 5 and absorption tower 4, a 20% solution of sodium carbonate in water may be introduced into absorption tower 4 and all of the solution drawn from this tower passed to evaporator 6. The concentration of the soda ash solution introduced into tower 4 in such a modification of the process or the proportion of water and soda ash introduced into dissolver 5 of the process illustrated in Fig. 2 may be varied over a wide range. In general, the water and sodium carbonate should be introduced in the proportions of 5 parts or more of sodium carbonate to every 100 parts of water. Either the absorption of the nitrosyl chloride in the sodium carbonate solution or the evaporation of the resulting solution and recovery of sodium chloride and sodium nitrite therefrom, or both steps, may be carried out continuously, as described above, or by batch operations. The withdrawal of mother liquor from which sodium nitrite has been filtered from the system in which sodium nitrite and sodium chloride are being recovered and return of this mother liquor to mixer 1 may be omitted, if desired, and the presence of sodium nitrate in the sodium nitrite product from filter 9 is not objectionable for the purposes to which the sodium nitrite is to be put.

I claim:

1. In a process for the production of a nitrate and chlorine in which a metal chloride and nitric acid are continuously supplied to a reaction mixture of the same which is heated to form a nitrate and a gas mixture containing nitrosyl chloride and chlorine, that improvement which comprises separating the nitrosyl chloride from the chlorine, passing the thus separated nitrosyl chloride in contact with an aqueous liquid containing a soluble inorganic alkaline material to form a chloride and a nitrite, maintaining said liquid non-acidic throughout its contact with said nitrosyl chloride to promote the formation of said nitrite, treating at least a portion of the nitrite thus formed with nitric acid to convert it into nitrate and incorporating the resulting nitrate and chloride formed from said nitrosyl chloride with said reaction mixture and thereafter heating the reaction mixture to evolve said nitrosyl chloride and chlorine.

2. In a process for the production of an alkali metal nitrate and chlorine in which an alkali metal chloride and nitric acid of a concentration above 40% HNO$_3$ are continuously supplied to a reaction mixture of the same which is heated to form a nitrate and a gas mixture containing nitrosyl chloride and chlorine, that improvement which comprises separating the nitrosyl chloride from the chlorine, passing the thus separated nitrosyl chloride in contact with a solution of an alkaline compound of an alkali metal to form a chloride and a nitrite, maintaining said solution non-acidic throughout its contact with said nitrosyl chloride to promote the formation of said nitrite, evaporating at least a portion of the water in the resulting solution of nitrite and chloride, treating with nitric acid the nitrite in the solution which is evaporated to convert it into nitrate and incorporating the resulting solution of nitrate and chloride formed from said nitrosyl chloride with said reaction mixture, thereafter heating the reaction mixture to evolve said nitrosyl chloride and chlorine and limiting by said evaporation of water in the solution of nitrite and chloride the dilution of said reaction mixture with water to an amount insufficient to lower the ratio of nitric acid to water in the reaction mixture to below 40 to 60.

3. In a process wherein concentrated nitric acid and a metal chloride are reacted to form a metal nitrate and a gas mixture containing nitrosyl chloride and chlorine and said gas mixture is treated to separately recover its constituents, the improvement which comprises separating the chlorine from the nitrosyl chloride and then introducing the nitrosyl chloride into a cyclic system in which a solution of a chloride and nitrite containing a soluble inorganic alkaline material is contacted with said nitrosyl chloride to decompose the nitrosyl chloride forming chloride and nitrate, the resulting solution is withdrawn from contact with the nitrosyl chloride, an inorganic alkaline material is dissolved in the solution and it is returned into contact with said nitrosyl chloride, said alkaline material being dissolved in the solution in amount sufficient to maintain it non-acidic throughout its contact with said nitrosyl chloride, continuously withdrawing from said cyclic system solution of nitrite and chloride produced therein, treating at least a portion of the solution with nitric acid to convert the nitrite therein into nitrate and incorporating the solution now containing nitrate and chloride with said reaction mixture and thereafter heating the reaction mixture to evolve said nitrosyl chloride and chlorine therefrom.

4. In a process for the production of an alkali metal nitrate and chlorine in which an alkali metal chloride and concentrated nitric acid are continuously supplied to a reaction mixture of the same which is heated to form a nitrate and a gas mixture containing nitrosyl chloride and chlorine, that improvement which comprises mixing substantially 60% to substantially 65% nitric acid with solid alkali metal chloride to form said reaction mixture, heating the mixture to evolve nitrosyl chloride and chlorine, separating the nitrosyl chloride from the chlorine, passing the thus separated nitrosyl chloride in contact with a solution of an alkaline compound of an alkali metal to form a chloride and a nitrite, maintaining said solution non-acidic throughout its contact with said nitrosyl chloride to promote the formation of said nitrite, introducing substantially 25% of the resulting solution of nitrite and chloride into said reaction mixture prior to heating the reaction mixture to evolve said nitrosyl chloride and chlorine and limiting the dilution of said reaction mixture with water contained in the solution of nitrite and chloride by supplying to the solution contacted with the nitrosyl chloride gas water and said alkaline compound of an alkali metal in amount sufficient to react with the nitrosyl chloride to form a solution containing less than 100 parts of water for every 10 to 30 parts of total alkali metal chloride, nitrite and nitrate.

5. The process for the production of an alkali metal nitrate and an alkali metal nitrite which comprises reacting an alkali metal chloride with concentrated nitric acid to form a solution of alkali metal nitrate and a gas mixture containing nitrosyl chloride and chlorine, separating the nitrosyl chloride from the chlorine contained in said gas, then passing the nitrosyl chloride in contact with a solution of an alkaline compound of an alkali metal which is maintained non-acidic throughout its contact with the nitrosyl chloride to form a solution of alkali metal chloride and nitrite, crystallizing from the solution thus produced solid alkali metal nitrite separate from the alkali metal chloride contained in said solution and incorporating the mother liquor from which said alkaline metal nitrite has been recovered, said mother liquor containing residual alkali metal nitrite and alkali metal chloride, with alkali metal chloride and nitric acid which are then reacted to form a solution of alkali metal nitrate and a gas mixture of nitrosyl chloride and chlorine.

6. The process for the production of sodium nitrate and sodium nitrite which comprises reacting sodium chloride with concentrated nitric acid to form a solution of sodium nitrate and a gas mixture containing nitrosyl chloride and chlorine, separating the nitrosyl chloride from the chlorine contained in said gas, then passing the nitrosyl chloride in contact with a solution of an alkaline sodium compound which is maintained non-acidic throughout its contact with the nitrosyl chloride to form a solution of sodium chloride and sodium nitrite, evaporating said solution to crystallize therefrom sodium chloride, separating the crystallized sodium chloride from the mother liquor from which it is crystallized, cooling said mother liquor to crystallize therefrom sodium nitrite, separating the crystallized sodium nitrite from the solution from which it is crystallized and incorporating mother liquor from which said sodium nitrite has been recovered, said mother liquor containing residual sodium nitrite and sodium chloride, with sodium chloride and nitric acid which are then reacted to form a solution of sodium nitrate and a gas mixture of nitrosyl chloride and chlorine.

7. The process for the production of sodium nitrate and sodium nitrite which comprises reacting sodium chloride with concentrated nitric acid to form a solution of sodium nitrate and a gas mixture containing nitrosyl chloride and chlorine, separating the nitrosyl chloride from the chlorine contained in said gas, then passing the nitrosyl chloride in contact with a solution of sodium carbonate containing about 1 part sodium carbonate calculated as Na$_2$CO$_3$ to every 4 parts H₂O, withdrawing the solution from contact with the nitrosyl chloride while it still contains about 0.02 part sodium carbonate calculated as Na₂CO₃ to every 6 parts H₂O, thereby forming a solution of sodium chloride and sodium nitrite, evaporating said solution to crystallize therefrom sodium chloride, separating the crystallized sodium chloride from the mother liquor from which it is crystallized, cooling said mother liquor to crystallize therefrom sodium nitrite, separating the crystallized sodium nitrite from the solution from which it is crystallized, evaporating a part of the solution from which sodium nitrite has been separated together with additional quantities of said solution of sodium chloride and sodium nitrite to crystallize therefrom sodium chloride, and incorporating another portion of the solution from which sodium nitrite has been separated with sodium chloride and nitric acid which are then reacted to form a solution of sodium nitrate and a gas mixture containing nitrosyl chloride and chlorine.

8. In a process for the production of a nitrate and chlorine in which a metal chloride and nitric acid are continuously supplied to a reaction mixture of the same which is heated to form a nitrate and a gas mixture containing nitrosyl chloride and chlorine, that improvement which comprises separating the nitrosyl chloride from the chlorine, passing the thus separated nitrosyl chloride in contact with an aqueous solution of an inorganic alkaline material to form a chloride and a nitrite, maintaining said solution non-acidic throughout its contact with said nitrosyl chloride to promote the formation of said nitrite, incorporating a minor proportion only of the resulting solution with said reaction mixture and heating the reaction mixture to evolve said nitrosyl chloride and chlorine.

HERMAN A. BEEKHUIS, Jr.